United States Patent [19]
Elsing et al.

[11] Patent Number: 4,521,819
[45] Date of Patent: Jun. 4, 1985

[54] CARTRIDGE LOAD MECHANISM

[75] Inventors: John W. Elsing, Edina; Gene F. Gorham, Hopkins; Steven D. Knopp, Bloomington, all of Minn.

[73] Assignee: Magnetic Peripherals Inc., Minneapolis, Minn.

[21] Appl. No.: 432,573

[22] Filed: Oct. 4, 1982

[51] Int. Cl.³ .............................................. G11B 25/04
[52] U.S. Cl. .......................................... 360/97; 360/98
[58] Field of Search ...................... 360/97–99; 346/137; 206/444; 403/24, 322, 325

[56] References Cited
U.S. PATENT DOCUMENTS 3,487,390 12/1969 Klinger ................................... 360/98
4,216,510 8/1980 Manzke ............................ 360/97 X Primary Examiner—A. J. Heinz
Attorney, Agent, or Firm—E. P. Heller, III; J. A. Genovese

[57] ABSTRACT

A mechanism for receiving, cradling, and loading, under force, a disk drive cartridge onto the drives spindle is disclosed. The mechanism has an U-shaped cradle, a transverse yoke, and a centrally mounted nub for applying downward pressure on the cartridge. A lever, actuated by motion of the drive's door, moves the cradle/yoke combination in the vertical direction.

8 Claims, 11 Drawing Figures

CARTRIDGE LOAD MECHANISM

BACKGROUND OF THE INVENTION

1. Field of the Invention

The invention relates primarily to cartridge disk drives for computer off-line storage and more specifically to cartridge load mechanisms.

2. Brief Description of the Prior Art

The present invention is a cartridge load mechanism designed to be used in conjunction with the inventor's co-pending application "Quick Disconnect Pack", Ser. No. 224,362, now U.S. Pat. No. 4,391,543, by John Elsing. That application describes a cartridge/spindle connection technique which requires a mechanical, as opposed to a magnetic, connection between the drive's spindle and the rotatable disk. With magnetic connection techniques, force had to be applied when unloading the cartridge to break the magnetic connection. In contrast, the present invention requires a considerable force be applied when loading the cartridge onto the spindle.

For an example of a cartridge load mechanism involving a magnetic connection, see Patel, et al., U.S. Pat. No. 4,310,864.

Another type of cartridge, which is illustrated in FIG. 13 of co-pending application Stricklin, et al., Ser. No. 257,086, now U.S. Pat. No. 4,412,260, represents a hybrid type. It is connected to the spindle magnetically, but it also requires a downward pressure on top of the cartridge to release the rotatable disk housed in the cartridge. Compare FIG. 13 thereof to FIG. 7. In this light, the load mechanism of Stricklin, et al., possesses a transverse inverted yoke 50 having an abutting portion 106 which applies force to the top of the cartridge.

This latter load mechanism cannot be used to load the Elsing '362 cartridge because the entire cartridge mechanism is pivoted about a rear portion thereof. See pivot 204 on FIGS. 7–12 of Stricklin, et. al. The cartridge of Stricklin, et. al., is lowered onto the spindle at an angle.

In contrast, the cartridge of Elsing '362 must be lowered onto the spindle with a substantially axial motion.

SUMMARY OF THE INVENTION

The invention comprises a axial loading cartridge load mechanism of a type having a cradle for holding a disk drive cartridge and a yoke for applying force to the top of the cartridge. The load mechanism has guide means for constraining its motion to a axial direction, an L-shaped lever means connected to the cartridge cradle, the L-shaped lever having a slot to compensate for disparity in motion between the lever and cradle, a linkage means between the lever and a pivotally mounted hinge, and a door mounted on said hinge. The opening and closing of the door actuates the hinge to in turn actuate the L-shaped lever means to move the cradle up and down with considerable mechanical advantage.

Also operated by the action of the hinge/linkage means is a straight lever means connected to an axle, which in turn is connected to an arm. Motion of the hinge causes the arm to move a small distance up and down. The arm is operably connected to the spindle's stub release mechanism of the Elsing '362 invention. Actuation of the stub release mechanism releases the Elsing '362 cartridge from mechanical connection to the spindle.

DESCRIPTION OF THE PREFERRED EMBODIMENT

Figure 1A:
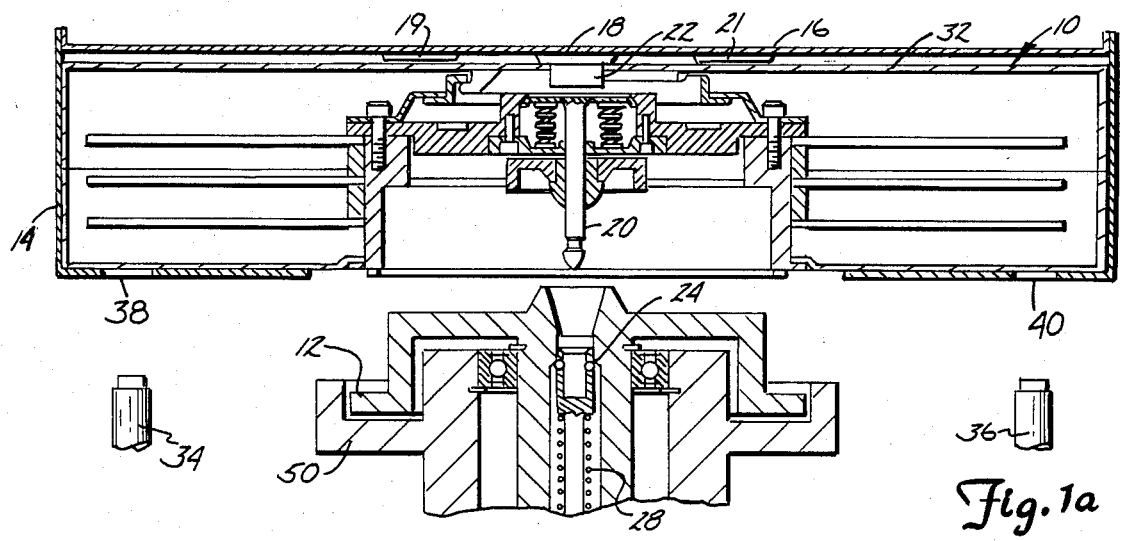
FIGS. 1a, 1b, and 1c are a front cross-sectional view of a cradle and cartridge of the present invention being loaded onto a cartridge disk drive spindle.
Figure 1B:
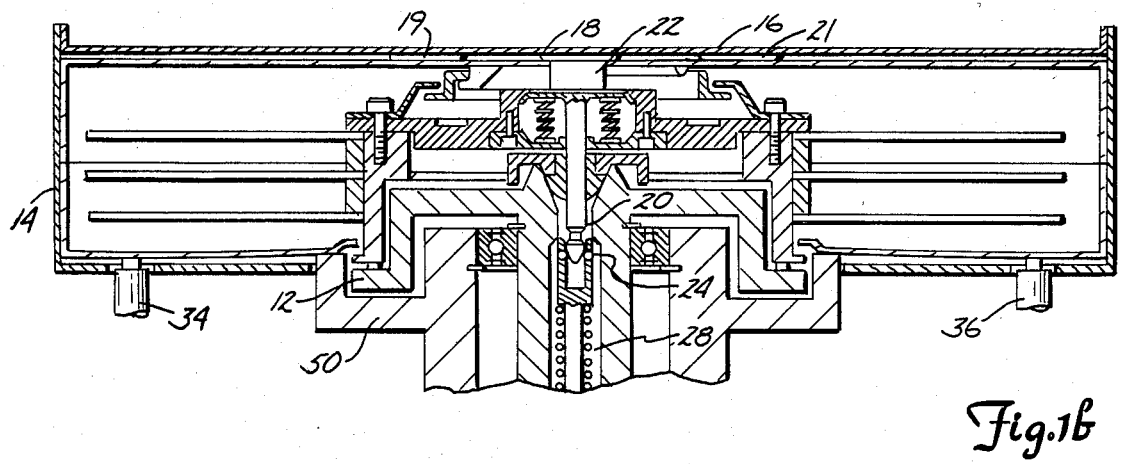
Figure 1C:
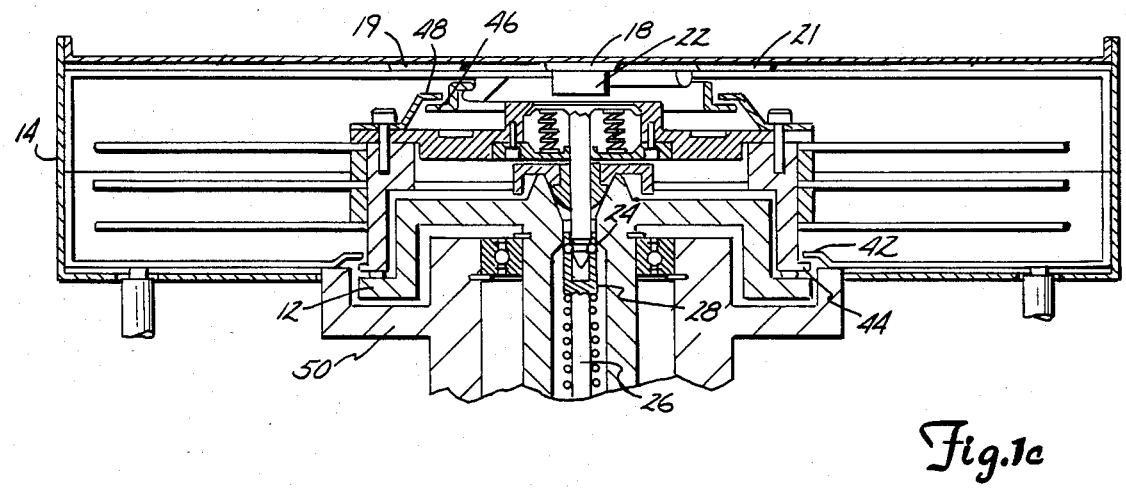

FIGS. 1a, 1b and 1c show a cartridge 10 of a type which requires forcible connection with spindle 12. The cartridge is mounted in cradle 14 having a yoke 16 running above the cartridge. Nub 18 is mounted at the center of yoke 16 facing cartridge 10.

In the position shown in FIG. 1, the cartridge disk drive door is open (discussed infra) and the cradle is elevated so that stub 20 clears spindle 12. In this position, the cartridge 10 may be inserted or withdrawn from the cradle.

After the cartridge has been inserted, the door is closed and the load mechanism (infra) lowers the cartridge axially onto the spindle. Intermediate between the door being fully open and fully closed, the cartridge/cradle reaches a low point shown in FIG. 1b.

At this point yoke nub 18 is pressing with considerable force (about 60 lbs) against the top of the cartridge 10, which flexes downwards. Cartridge nub 22 presses against stub 20 forcing it down into a position for registration with locking balls 24. The balls 24 and slide (release shift) 26 in which they are mounted are at the intermediate position withdrawn a short distance down into the annular chamber 28. See discussion infra. This allows the balls 24 space to move outwards, which in turn allows stub 20 either to be inserted or withdrawn from the spindle 12.

As the door is closed even further, the spring-loaded slide 26 is released (discussed infra), allowing the balls to move up the annular chamber to inclined walls 30. The cradle 14 a little later also moves back up a small distance withdrawing stub 20 a short distance. However, when the stub's annular groove registers with balls 24, it cannot be withdrawn further. Further closing of the door continues cradle 14's motion back up, however stub 20 remains locked to the spindle.

As a result, a small clearance appears between cartridge nub 22 and stub 20, allowing stub 20 to spin with the spindle 12 and not rub against the stationary cartridge housing 32 through nub 22.

Posts 34 and 36, intruding through apertures 38 and 40 in the bottom of cradle 14, abut against the bottom 42 of the cartridge housing in the closed position of FIG. 1c and push the flexible bottom 42 away from engagement with disk hub flange 44. Similarly yoke nub 18 forces the top of cartridge housing 14 down to disengage a cartridge housing flange 46 from a second disk hub flange 48. This frees the disk/spindle combination to spin without engaging cartridge housing 14.

When removing the cartridge from the spindle 12 the door is opened. The opening of the door first causes yoke nub 18 to press on stub 20 to release the holding force and second, the slide (release shaft) 26 to be withdrawn downwards. This pulls the balls 24 from registration with the stub 20 and frees it to be withdrawn under spring force 21 from the spindle 12. Further opening of the door withdraws the stub 20 faster than slide 26 is released so that the stub cannot again be recaptured by the balls 24.

Figure 2:
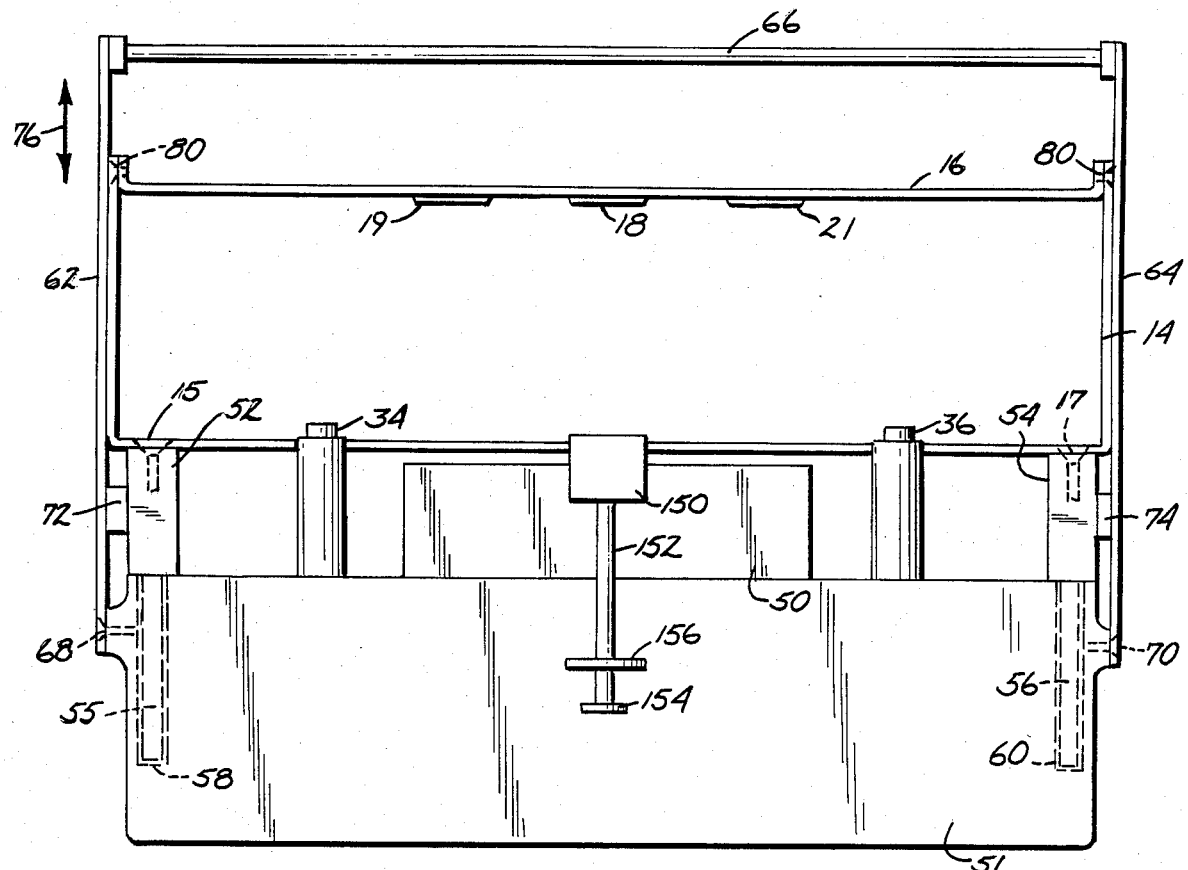
FIG. 2 is a front plan view of the cradle and vertical guide means.

FIG. 2 shows a front plan view of the essential elements of the present invention. Shown in this Fig. is spindle housing 50, cradle 14, transverse yoke 16, yoke nub 18, posts 34, 36 for lifting the bottom 42 of the cartridge housing, lever blocks 52, 54 attached to the bottom of cradle 14 by screws 15, 17, and block guides 55, 56 mounted on blocks 52, 54 and inserted into guide shafts 58, 60 mounted in deck housing 51. Also attached to deck housing 51 by screws 68, 70 are cradle guides 62, 64 supported at their higher extremities by two transverse guide posts, one of which 66 is shown in figure. Mounted on blocks 52, 54 are lever nubs 72, 74 by which the L-shaped levers (infra) connects to blocks 52, 54 to drive cradle 14 up and down.

FIG. 2 also shows secondary nubs 19 and 21 to maintain dimensional control for running clearance in cartridge flange at 46.

The arrows 76 show the approximate limit of the motion of the cradle 14 in the axial direction. The combination of the block guides 55, 56 and cradle guides 62, 64 limits the cradles freedom of motion to the axial plane.

At the front of cradle 14 and mounted on the bottom of the cradle 14 (FIGS. 3, 4) is retainer 150, which retains the cartridge 10 in the cradle 14 after insertion. See FIG. 3. Mounted on retainer 150 is shaft 152 having a head 154 mounted on its end. The shaft 152 runs through an aperture in stop 156 which is fixedly mounted on deck housing 51.

As the retainer 150 is mounted on the cradle 14, it follows the cradle's motion upwards on opening the door until head 154 runs into stop 156, at which point its motion upwards is arrested. Further motion of the cradle upwards withdraws the retainer from the cartridge to allow it to be withdrawn from the cradle.

Suitable spring-loaded eject means (not shown) may be provided to eject the cartridge once retainer 150 is withdrawn. The ejected cartridge 10 would then block relative upwards motion of the retainer 150 when the cartridge is lowered into a so-called neutral position (discussed infra). At this neutral position, the door may be released by the operator and it will stay in its relatively open position. The operator may then withdraw the cartridge. Likewise, at this position, the operator may load a cartridge by pushing it into the cradle against the force of the eject mechanism until the front edge of the cartridge clears retainer 150. The retainer, under flexural tension (FIGS. 3, 4), then pops up to retain the cartridge in the cradle until the door is again opened further.

Figure 3:
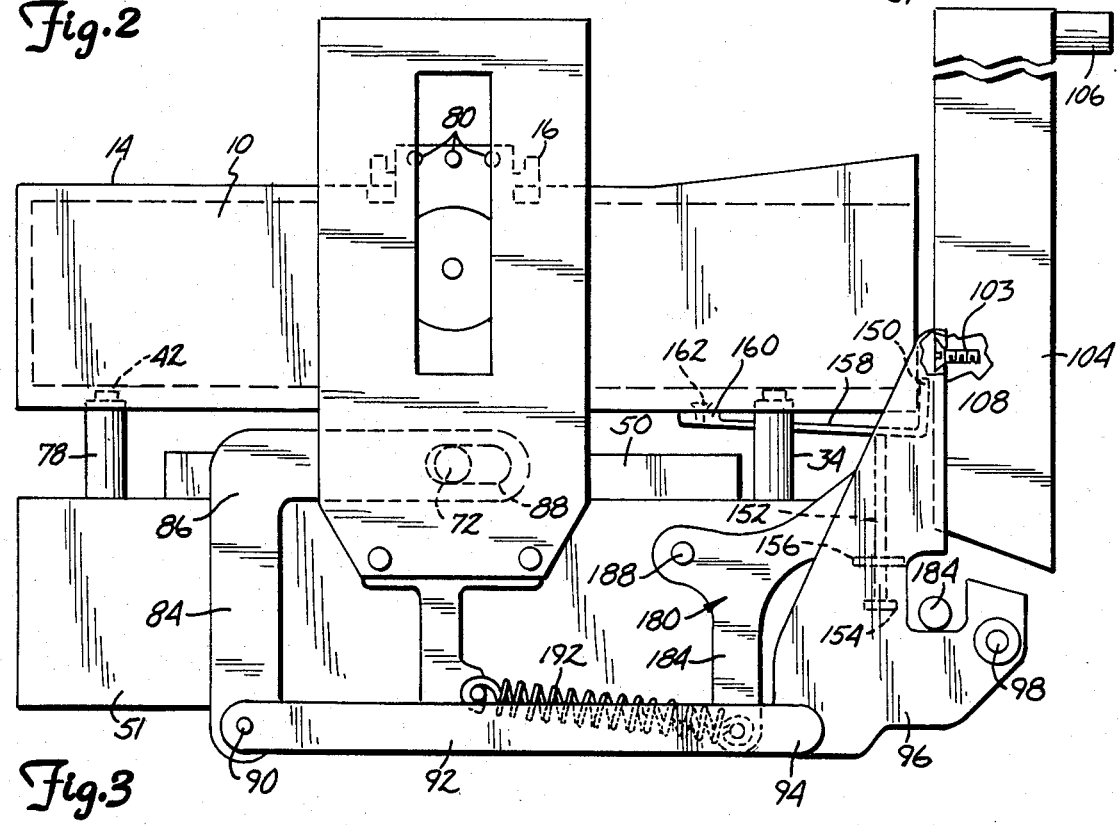
FIG. 3 is a plan view of one side of the cartridge load mechanism of the present invention.
Figure 4:
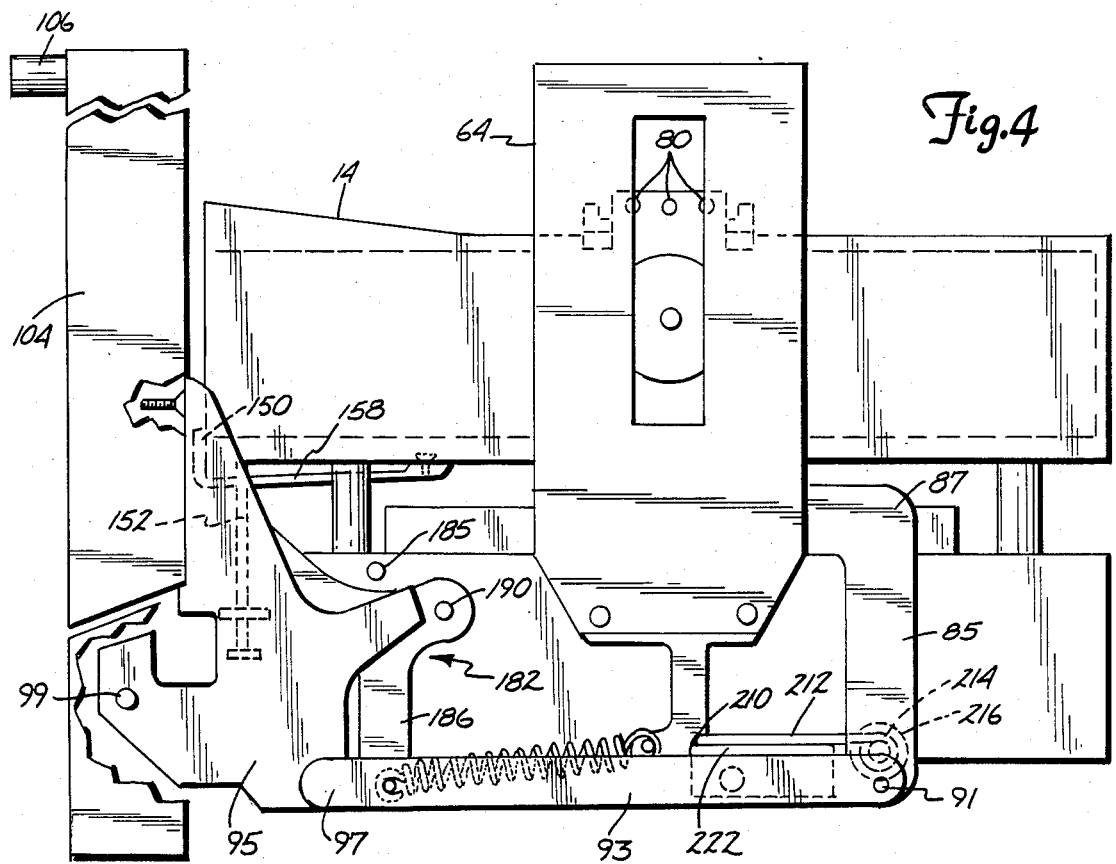
FIG. 4 is a plan view of the other side of the cartridge load mechanism.

Referring briefly to FIGS. 3 and 4, the retainer 150 is attached to flexible arm 158 which is in turn mounted on block 160. Block 160 is affixed to cradle 14 by screw (rivet) 162. In the preferred embodiment, the mounting block 160, flexible arm 158 and retainer 160 are made of a single piece of molded plastic. Shaft 152, head 154 and stop 156 are metal.

FIGS. 3 and 4 show side plan views of other essential elements of the present invention. Shown is cradle 14, a cartridge 10 in phantom line, two posts 78, 34 for lifting the bottom 42 of the cartridge, transverse yoke 16 affixed to cradle 14 by screws 80, cradle guide 62, spindle housing 50, and deck housing 51.

The following elements were not previously discussed and are duplicated in the preferred embodiment on each side of the deck 51. These elements are L-levers 84, 85 pivotally mounted on deck housing 51 at their elbows 86, 87. The L-levers are slidably connected to nubs 72, 74 via an elongated apertures 88 which compensates for disparity in motion between the L-levers and the cradle 14, to which the nubs are connected via blocks 52 and 54

Pivotally connected to L-levers 84, 85 at point 90, 91 are arms 92, 93. Arms 92, 93 are in turn pivotally connected at points 94, 97 to hinges 95, 96, which are in turn pivotally mounted on deck housing 51 at points 98, 99.

Mounted on hinges 95, 96 by screws 103 is door 104 and handle 106.

When the door is fully closed, and the drive is activated, it is desirable that the door be locked to prevent opening of the door. In this regard, solenoid-activated shafts 184, 185 are provided to protrude into the plane of rotation of hinges 95 and 96 to block its motion.

Figures 5, 8:
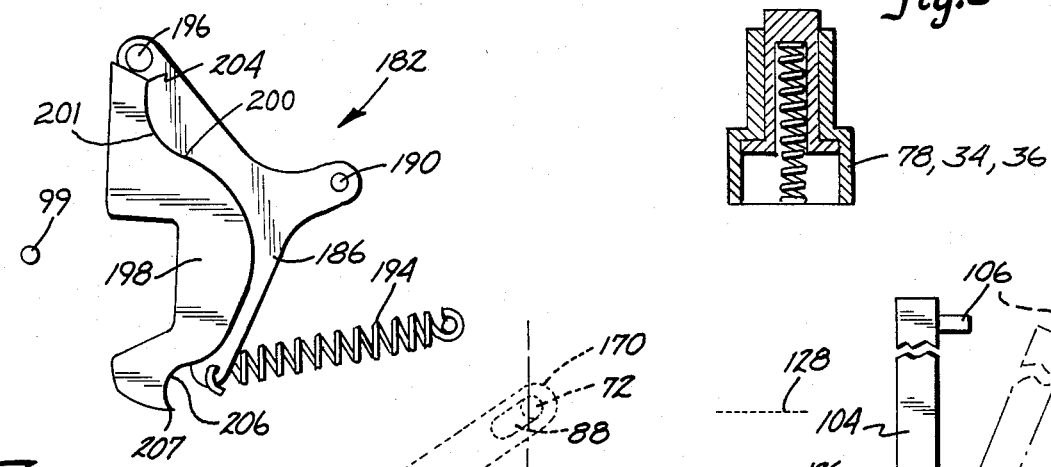
FIG. 5 is a plan view of the door assist mechanism.
FIG. 8 is a cross sectional view of one of the abutment posts.

Also shown in FIGS. 3, 4, and 5 are door assist mechanisms 180, 182 comprised each of a Y-lever 184, 186 pivoted at points 188, 190, and connected at one arm to springs 192, 194. The other arms of the Y-levers mount a roller 196 such as shown in FIG. 5. A cam surface such as 198 is mounted on each hinge 95, 96.

FIG. 5 shows the cam surface and assist mechanism at their positions when the door is closed. When the door is opened from this position, the roller must initially go up a "hill" to point 204, thus the motion is resisted by spring 194. On the closing of the door, the door is assisted closed by going down this "hill."

From point 204 until point 201, there is a decline on opening the door, which causes the assist 182 to apply force to assist in the opening of the door.

At point 201 the cam surface inclines to point 200. This assists the operator in closing the door because between 200 and 201 in the closing of the door, the load mechanism is exhibiting its peak resistance.

At point 200, the cam surface assumes a constant radius vis-a-vis hinge pivot 99. The assist 182 provides no force to the door in this region.

Next, there is a detent area 206 with sharp rise on each side. The assist mechanmism 182 in this region acts to hold the door at a constant position. Finally, there is a stop 207.

Figure 6:
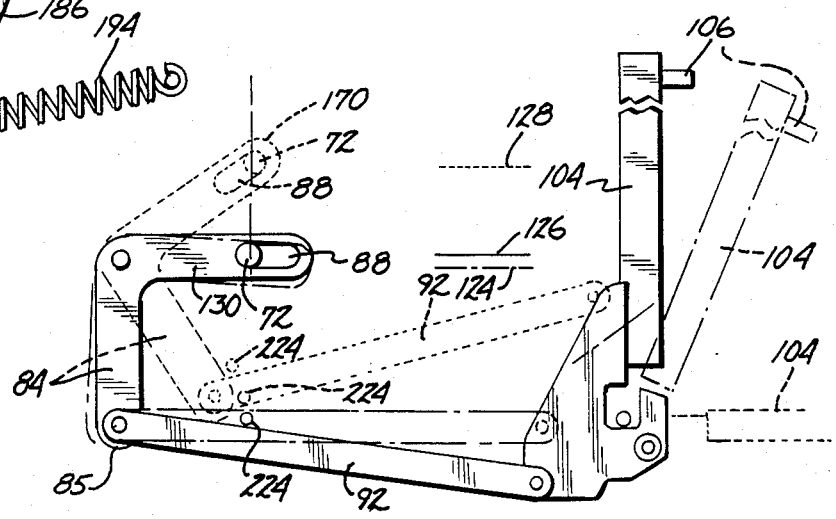
FIG. 6 shows the motion of the circular lever and L-lever on opening of the door.

FIG. 6 shows the operation of door 104 to actuate the various levers to raise and lower cradle 14.

The opening of the door 104 causes hinge 96 to pivot about pivot 98 raising arm 92 and forcing arm 85 of L-lever 84 backwards a small distance. This causes the cradle to move downwards a small distance denoted by the dotted line 124. The solid line 126 immediately above it is the relative position of the cradle 14 when the door was closed.

Further opening of the door causes arm 94 to be drawn up and to the right in the figure, which in turn pulls the arm 85 of L-lever 84 to the right. The L-lever, pivoting about its pivot 86, forces the cradle to move upwards to the relative position denoted by dotted line 128.

The disparity of motion between, L-lever 84 and cradle 14 is compensated by the elongated aperture 88 in the other arm 170 of L-lever 84.

The closing of the door essentially reverses this process. The cradle 14 is lowered to a low intermediate point 124 and then is raised to its final position 126. As mentioned above, the purpose for this is to engage or disengage the cartridge stub 20 from balls 24, and allow the nub 22 on the top of the cartridge housing 10 to be withdrawn a slight distance from stub 20.

Figure 7A:
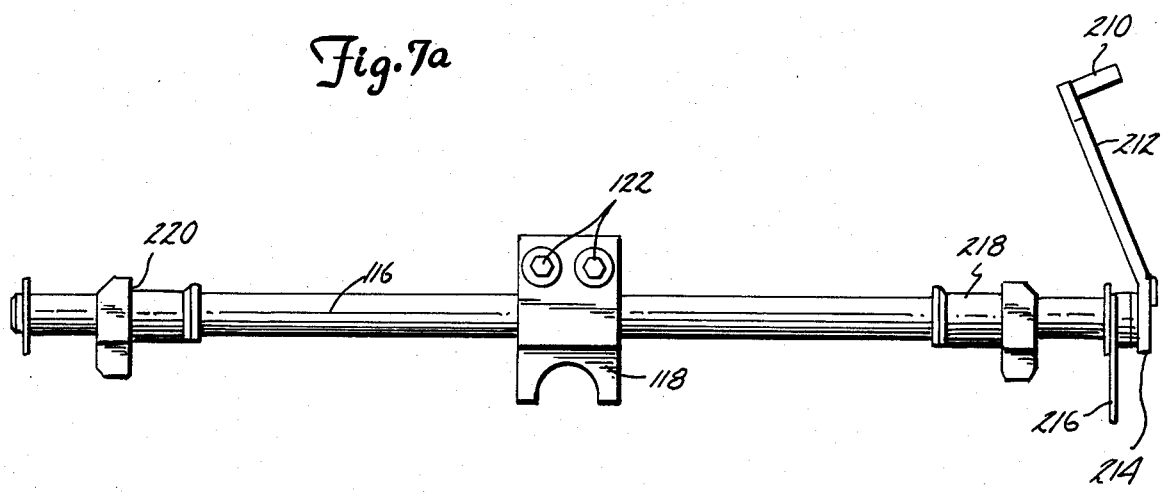
FIGS. 7a and 7b show a plan view of the release actuator mechanism.
Figure 7B:
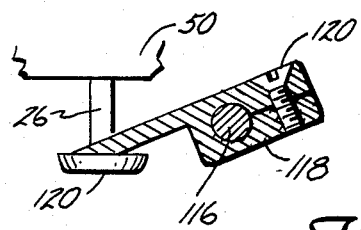

Referring back to FIG. 4 and to FIGS. 7a and 7b, there is also shown in the FIG. 7 a spindle release actuator mechanism 118 which operates to force the release shaft 26 down when the door is opened to releast stub 20 from registration with balls 24.

Shown in FIG. 4 is a stub 210, arm 212, and, in dotted line, pivot 214. Also shown is spring 216. These same elements are shown in FIG. 7. Also shown in FIG. 7 are annular bearings 218, 220 which are mounted in annular bearings (not shown) in deck housing 51. Connected to pivot 214 through bearings 218, 220 is axle 116. Mounted on axle 116 by bolts 122 is release actuator 118, which fits around release shaft 26. Also shown in FIG. 4 is plastic slide 222 mounted on arm 93. When arm 93 is raised and lowered (see FIG. 6 which shows arm 92's motion), it raises and lowers arm 212 by contact with stub 210. An imaginary stub 224 is shown in FIG. 6 to illustrate this motion. The actual stub 210 is actuated by motion of the other arm 93. When arm 212 pivots upwards on opening the door, release actuator 118 pivots downwards against collar 120 mounted on release shaft 26 to force it down and release cartridge stub 20 from spindle 12. Stub 210 rides along plastic slide member 222 which reduces friction and noise.

Spring 216 biases the arm 212 downwards in FIG. 4. When the hinge arm 93 is lowered, the release actuator arm 212 returns to its initial position under urging of this spring 216.

The motion is essentially reversed on the closing of the door.

Posts 34, 36, 78 and the rear right post, not shown, are all spring loaded, FIG. 8. The spring loading of the posts 34, 36, 78 prevents solid abutment of the cartridge housing against a solid post when the cradle reaches its low, intermediate position on closing or opening of the door. Not only does this preserve cartridge housing integrity over a long lifetime by reducing the amount of force to which it is subjected, but it also reduces the force necessary to close the door.

This completes a description of the preferred embodiment of the present invention.

The enumeration of specific elements of the preferred embodiment should not be taken as a limitation of the appended claims, in which I claim:

1. A cartridge load mechanism for a cartridge disk drive having a spindle, comprising:
   a disk cartridge having a flexible housing and a disk pack mounted therein;
   a cartridge cradle having a transverse yoke and means for mounting therein said disk cartridge, the cradle further having an aperture in a bottom through which the disk pack may be lowered into mounting contact with the spindle of the cartridge disk drive;
   a nub mounted centrally on said yoke and projecting towards a top of the disk cartridge; said nub adapted to press said disk pack into locking contact with said spindle at a lowermost position by pressing against the top of the disk cartridge flexible housing;
   means for constraining the motion of said cartridge cradle to substantially the axial direction vis-a-vis said spindle;
   a lever having a crank arm which is affixed to said cradle by means adapted to accommodate disparity in motion between said lever and said cradle; said lever pivotally mounted on said cartridge disk drive;
   a hinge pivotally mounted on said cartridge disk drive;
   a door fixedly mounted on said hinge;
   an arm one end of which is pivotally mounted on said hinge and
   the other end of which is pivotally mounted on a second crank arm of said lever;
   means including said hinge and arm for connecting same to said lever such that partially closing the door causes the arm and lever to lower the cradle to a lowermost position wherein the nub presses the disk pack into locking contact with the spindle and further closing movement of the door moves the cradle back up to an intermediate position wherein the flexible housing top flexes back such that it no longer presses on the disk pack, the disk pack remaining locked onto the spindle, whereby the disk pack is free to spin without rubbing against the housing top.

2. The cartridge load mechanism of claim 1 further including:
   release lever means pivotally mounted on said cartridge disk drive and slidably mounted on said arm;
   axle means fixedly connected to said release lever means at its pivots;
   release actuator means fixedly mounted on said axle means for co-rotation therewith.

3. The cartridge load mechanism of claim 1 wherein means for constraining the motion of said cradle to the axial direction includes hollow shaft means mounted in said disk drive, and corresponding solid shaft means mounted on said cradle and slidably mounted in said hollow shaft means.

4. The cartridge load mechanism of claim 1 wherein said means for constraining the motion of said cradle to substantially the axial direction includes a pair of lateral guides mounted on said cartridge disk drive.

5. The cartridge load mechanism of claim 4 further including at least one transverse support member mounted between tops of said guides.

6. The cartridge load mechanism of claim 1 wherein said means adapted to accommodate disparity of motion between said lever and said cradle comprises a second nub mounted on said cradle and an elongated aperture mounted in said one crank arm of said lever, said second nub fitting inside said aperture.

7. The cartridge load mechanism of claim 1 further including retainer means for holding said disk cartridge in said cradle, said retainer means mounted on said cradle, the motion of said retainer means in the upwards direction of said cradle limited by a stop means.

8. The load mechanism of claim 1 further including a door assist mechanism comprising:
   a spring biased Y-lever;
   a roller mounted on one arm of said Y-lever;
   a second hinge upon which said door is also mounted;

a cam surface mounted on said second hinge having surfaces relative to the pivot of the second hinge inclined over a first arc, declined over a second arc, inclined over a third arc, held at a constant radius over a fourth arc, then having a detent;

said roller making contact with said cam surface at said first arc when the door is closed and at said detent when the door is almost fully open.

* * * * *